(12) United States Patent
Daniels et al.

(10) Patent No.: US 10,885,360 B1
(45) Date of Patent: Jan. 5, 2021

(54) CLASSIFICATION USING MULTIFRAME ANALYSIS

(71) Applicant: Lytx, Inc., San Diego, CA (US)

(72) Inventors: Jesse Daniels, San Diego, CA (US); Vincent Nguyen, San Diego, CA (US)

(73) Assignee: Lytx, Inc., San Diego, CA (US)

( * ) Notice: Subject to any disclaimer, the term of this patent is extended or adjusted under 35 U.S.C. 154(b) by 109 days.

(21) Appl. No.: 16/009,612

(22) Filed: Jun. 15, 2018

(51) Int. Cl.
*G06K 9/00* (2006.01)
*G06T 7/254* (2017.01)
*G06N 3/02* (2006.01)

(52) U.S. Cl.
CPC ...... *G06K 9/00825* (2013.01); *G06K 9/00711* (2013.01); *G06N 3/02* (2013.01); *G06T 7/254* (2017.01)

(58) Field of Classification Search
CPC .. G06K 9/00825; G06K 9/00711; G06N 3/02; G06T 7/254
USPC ........................................................ 382/104
See application file for complete search history.

(56) References Cited

U.S. PATENT DOCUMENTS

| | | | | |
|---|---|---|---|---|
| 9,824,337 | B1* | 11/2017 | Rodoni | G06F 3/04842 |
| 2013/0265423 | A1* | 10/2013 | Bernal | G06Q 30/0284 |
| | | | | 348/148 |
| 2014/0110311 | A1* | 4/2014 | Cilliers | B03D 1/028 |
| | | | | 209/165 |
| 2014/0376769 | A1* | 12/2014 | Bulan | G06K 9/00771 |
| | | | | 382/103 |
| 2015/0154452 | A1* | 6/2015 | Bentley | G06K 9/00711 |
| | | | | 386/201 |
| 2015/0310365 | A1* | 10/2015 | Li | G06Q 10/0639 |
| | | | | 705/7.38 |
| 2018/0154908 | A1* | 6/2018 | Chen | B60R 25/102 |

* cited by examiner

*Primary Examiner* — Mazda Sabouri
(74) *Attorney, Agent, or Firm* — Van Pelt, Yi & James LLP

(57) ABSTRACT

A system for video analysis includes an interface and a processor. The interface is configured to receive a trigger indication. The processor is configured to determine a time sequence set of video frames associated with the trigger indication; determine a decision based at least in part on an analysis of the time sequence set of video frames; and indicate the decision.

18 Claims, 9 Drawing Sheets

US 10,885,360 B1

CLASSIFICATION USING MULTIFRAME ANALYSIS

BACKGROUND OF THE INVENTION

Modern vehicles (e.g., airplanes, boats, trains, cars, trucks, etc.) can include a vehicle event recorder in order to better understand the timeline of an anomalous event (e.g., an accident). A vehicle event recorder typically includes a set of sensors—for example, video recorders, audio recorders, accelerometers, gyroscopes, vehicle state sensors, GPS (global positioning system), etc., that report data, which is used to determine the occurrence of an anomalous event. When an anomalous event is determined by a vehicle event recorder mounted on a vehicle it is advantageous to gather all available data related to the anomalous event in order to be able to make determinations about the event with as much accuracy as possible. Typical analyses are not able to make some complex determinations. In particular, often classification of an image taken by a vehicle event recorder is not able to be accurately made in order to generate a decision determination for a given situation.

BRIEF DESCRIPTION OF THE DRAWINGS

Various embodiments of the invention are disclosed in the following detailed description and the accompanying drawings.

DETAILED DESCRIPTION

Figure 1:
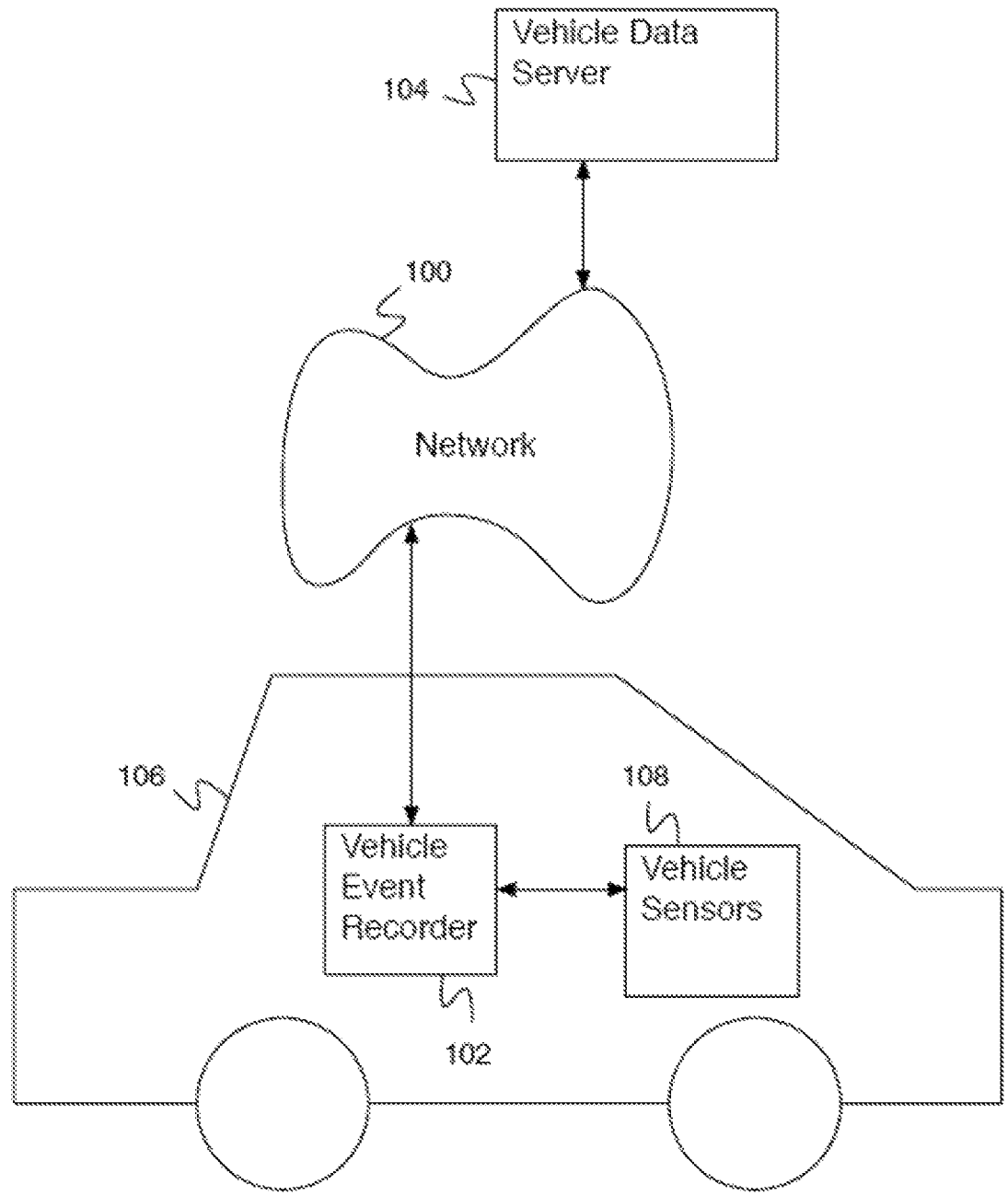
FIG. 1 is a block diagram illustrating an embodiment of a system including a vehicle event recorder.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for classification using multiframe analysis is disclosed. The system for video analysis includes an interface and a processor. The interface is configured to receive a trigger indication. The processor is configured to determine a time sequence set of video frames associated with the trigger indication; determine a decision based at least in part on an analysis of the time sequence set of video frames; and indicate the decision. In some embodiments, the processor is coupled to a memory that is configured to provide instructions to the processor.

A system for automatically determining whether a set of video frames or set of time sequenced images contains an activity or behavior of interest is disclosed. The system makes the automatic determination using an algorithmic combination of deep learning features extracted from a time sequence set of individual video frames to create an overall classification decision. This differs from typical single frame classification techniques and provides improved accurate automatic activity recognition from a set of video frames. The system can be used to improve review and monitoring activity.

The system for automatically determining whether a set of video frames or a set of time sequenced images processes the set of video frames or the set of time sequenced images from a camera that is mounted on a vehicle (e.g., a car, a van, a truck, a truck with a trailer, a garbage truck, a delivery truck, etc.). The analysis processing is performed by a server (after video frame data is transmitted to the server from the vehicle) or a computing system in the vehicle. The set of video frames or set of time sequenced images is determined by identifying one or more signals or sequence of signals from a vehicle bus signal. For example, a bin lift signal is detected on a garbage truck and a set of video frames is selected between a start time and a stop time that is determined based on the bin lift signal (e.g., a start time a predetermined time prior to the bin lift signal and a stop time another predetermined time after the bin lift signal). The selection of video frames comprises selecting the reference frames between the start time and the stop time. A determination is made using the video frames as to whether the bins as captured in the video frames are overflowing prior to being emptied. This determination can be used to determine a surcharge associated with the garbage pickup. In another example, a door open signal is received after an engine running signal has been present for longer than a cruising period. A start time and stop time are selected to bracket the door open signal and video is captured from an external and internal video camera. The selection of video frames comprises selecting the reference frames between the start time and the stop time. A determination is made using the video frames as to whether a passenger was picked up. This determination can be used to determine whether inappropriate action was done by a driver (e.g., breaking a rule of no driving of passengers in the vehicle).

In some embodiments, the system processes the video frames in parallel using a neural net and the results from the processing are combined and then processed again to make a determination. In some embodiments, the system processes the video frames in parallel using a classifier and these classifications are combined to determine a decision.

FIG. 1 is a block diagram illustrating an embodiment of a system including a vehicle event recorder. In the example shown, vehicle sensors 108 provide signals to vehicle event recorder 102. Depending on one or more signals from vehicle sensors 108, a start time and a stop time are determined and video frames are selected for processing. Processing is performed by vehicle event recorder 102 or by vehicle data server 104 after the video frames are transmitted via network 100 from vehicle event recorder 102 to vehicle data server 104.

Vehicle event recorder 102 comprises a vehicle event recorder mounted in a vehicle (e.g., a car, a truck, a trailer associated with a semi truck, a van, a bus, a commercial vehicle, etc.). Vehicle event recorder 102 is in communication with sensors 108. Sensors 108 comprises a sets of sensors—for example, one or more video recorders, audio recorders, accelerometers, gyroscopes, vehicle state sensors, proximity sensors, a global positioning system (e.g., GPS), outdoor temperature sensors, moisture sensors, laser line tracker sensors, etc. Vehicle state sensors comprise internal vehicle state sensors—for example a speedometer, an accelerator pedal sensor, a brake pedal sensor, an engine revolutions per minute (e.g., RPM) sensor, an engine running sensor, an engine temperature sensor, a headlight sensor, an airbag deployment sensor, driver and passenger seat weight sensors, an anti-locking brake sensor, traction control system sensors, drive wheel speed sensors, shocks sensors, an engine exhaust sensor, a gear position sensor, a cabin equipment operation sensor, etc. Vehicle event recorder 102 comprises a system for receiving and processing sensor data. Processing sensor data comprises filtering data, identifying patterns in data, detecting events, etc. Vehicle event recorder 102 is mounted on vehicle 106 in any appropriate location, for example the chassis, the front grill, the dashboard, the rear-view mirror, the rear window or wall, the floor, etc. There are times when vehicle event recorder 102 comprises multiple units mounted in different locations within vehicle 106 instead of a single unit, particularly when there are space constraints for a given location (e.g., behind the rear view mirror) and more space is required to house electronic components. Vehicle event recorder 102 comprises a communications system for communicating with network 100. Network 100 comprises a network for communications. Network 100 comprises one or more of a wireless network, a wired network, a cellular network, a Code Division Multiple Access (CDMA) network, a Global System for Mobile Communication (GSM) network, a Long-Term Evolution (LTE) network, a Universal Mobile Telecommunications System (UMTS) network, a Worldwide Interoperability for Microwave Access (WiMAX) network, a Dedicated Short-Range Communications (DSRC) network, a local area network, a wide area network, the Internet, etc. There are instances when network 100 comprises multiple networks—for instance, multiple interconnected networks spanning different regions, networks operating at different times, overlaid networks with different access permissions, networks with different bandwidth, etc. Different networks comprising network 100 typically comprise different bandwidth cost (e.g., a wired network has a very low cost, a wireless Ethernet connection has a moderate cost, a cellular data network has a high cost). In some embodiments, network 100 has a different cost at different times (e.g., a higher cost during the day and a lower cost at night). Vehicle event recorder 102 communicates with vehicle data server 104 via network 100.

Vehicle data server 104 comprises a vehicle data server for communicating with vehicle event recorder 102 via network 100. Vehicle data server 104 receives data, processes data, stores data, requests more data, provides stored data, etc. Video data received by vehicle data server 104 is stored in a database.

Figure 2:
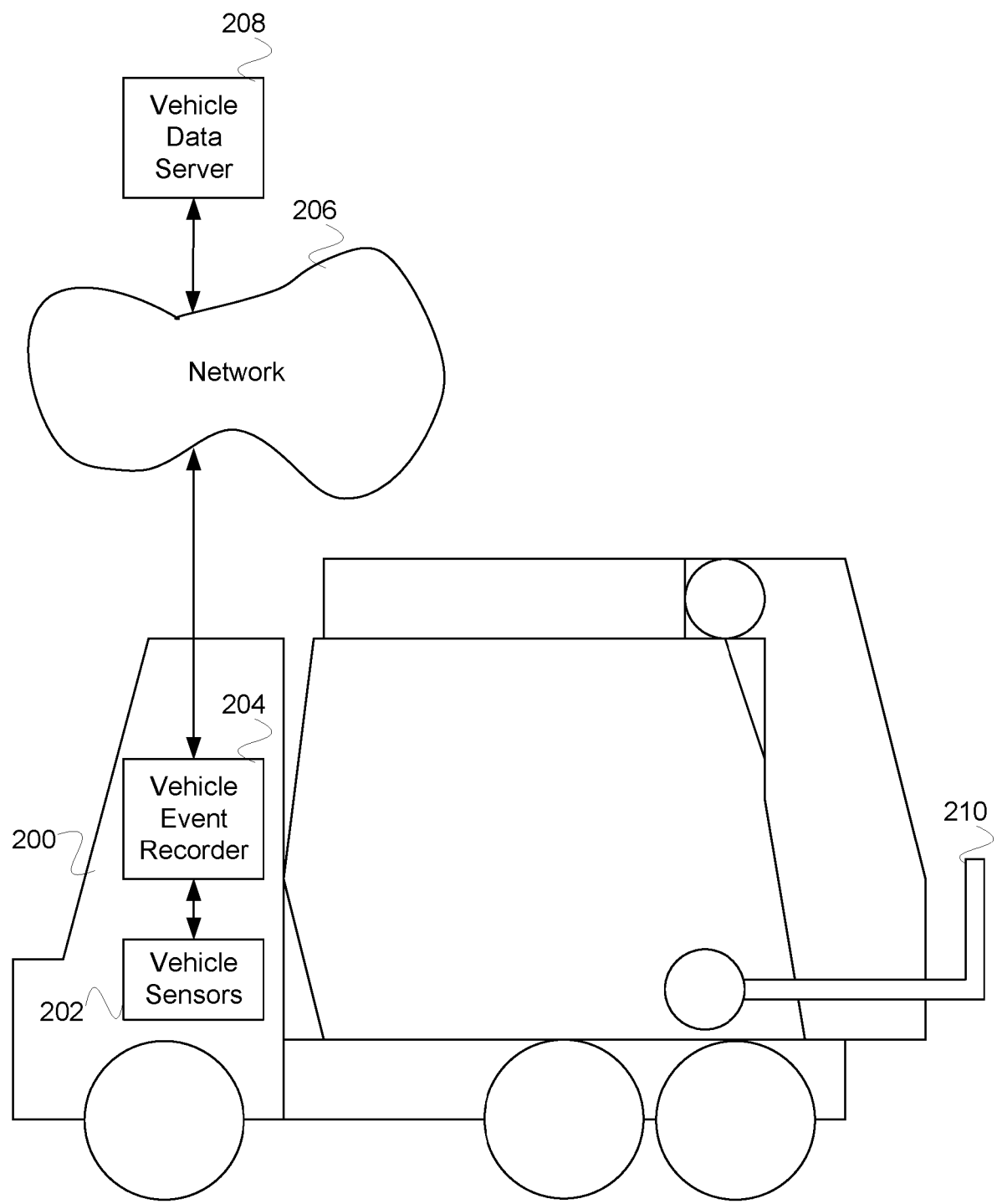
FIG. 2 is a block diagram illustrating an embodiment of a system including a vehicle event recorder.

FIG. 2 is a block diagram illustrating an embodiment of a system including a vehicle event recorder. In the example shown, vehicle sensors 202 provide signals to vehicle event recorder 204. Depending on one or more signals from vehicle sensors 202, a start time and a stop time are determined and video frames are selected for processing. Processing is performed by vehicle event recorder 204 or by vehicle data server 208 after the video frames are transmitted via network 206 from vehicle event recorder 204 to vehicle data server 208.

Vehicle event recorder 204 comprises a vehicle event recorder mounted in a vehicle (e.g., a car, a truck, a trailer associated with a garbage truck, a semi truck, a van, a bus, a commercial vehicle, etc.). Vehicle event recorder 204 is in communication with sensors 202. Sensors 202 comprises a sets of sensors—for example, one or more video recorders, audio recorders, accelerometers, gyroscopes, vehicle state sensors, proximity sensors, a global positioning system (e.g., GPS), outdoor temperature sensors, moisture sensors, laser line tracker sensors, etc. Vehicle state sensors comprise internal vehicle state sensors—for example a speedometer, an accelerator pedal sensor, a brake pedal sensor, an engine revolutions per minute (e.g., RPM) sensor, an engine running sensor, an engine temperature sensor, a headlight sensor, an airbag deployment sensor, driver and passenger seat weight sensors, an anti-locking brake sensor, traction control system sensors, drive wheel speed sensors, shocks sensors, an engine exhaust sensor, a gear position sensor, a cabin equipment operation sensor, etc. Vehicle event recorder 204 comprises a system for receiving and processing sensor data. Processing sensor data comprises filtering data, identifying patterns in data, detecting events, etc. Vehicle event recorder 204 is mounted on vehicle 200 in any appropriate location, for example the chassis, the front grill, the dashboard, the rear-view mirror, the rear window or wall, the floor, etc. There are times when vehicle event recorder 204 comprises multiple units mounted in different locations within vehicle 200 instead of a single unit, particularly when there are space constraints for a given location (e.g., behind the rear view mirror) and more space is required to house electronic components. Vehicle event recorder 204 comprises a communications system for communicating with network 206. Network 206 comprises a network for communications. Network 206 comprises one or more of a wireless network, a wired network, a cellular network, a Code Division Multiple Access (CDMA) network, a Global System for Mobile Communication (GSM) network, a Long-Term Evolution (LTE) network, a Universal Mobile Telecommunications System (UMTS) network, a Worldwide Interoperability for Microwave Access (WiMAX) network, a Dedicated Short-Range Communications (DSRC) network, a local area network, a wide area network, the Internet, etc. There are instances when network 206 comprises multiple networks—for instance, multiple interconnected networks spanning different regions, networks operating at different times, overlaid networks with different access permissions, networks with different bandwidth, etc. Different networks comprising network 206 typically comprise different bandwidth cost (e.g., a wired network has a very low cost, a wireless Ethernet connection has a moderate cost, a cellular data network has a high cost). In some embodiments, network 206 has a different cost at different times (e.g., a higher cost during the day and a lower cost at night). Vehicle event recorder 204 communicates with vehicle data server 208 via network 206.

Vehicle data server 208 comprises a vehicle data server for communicating with vehicle event recorder 204 via network 206. Vehicle data server 208 receives data, processes data, stores data, requests more data, provides stored data, etc. Video data received by vehicle data server 208 is stored in a database. Bin lift 210 lifts bins for dumping. Vehicle event recorder 204 receives an indication of a bin lift has occurred and determines a start time and a stop time and a time sequence set of video frames. Processing of the frames to determine a decision occurs either on vehicle event recorder 204 or on vehicle data server 208.

Figure 3:
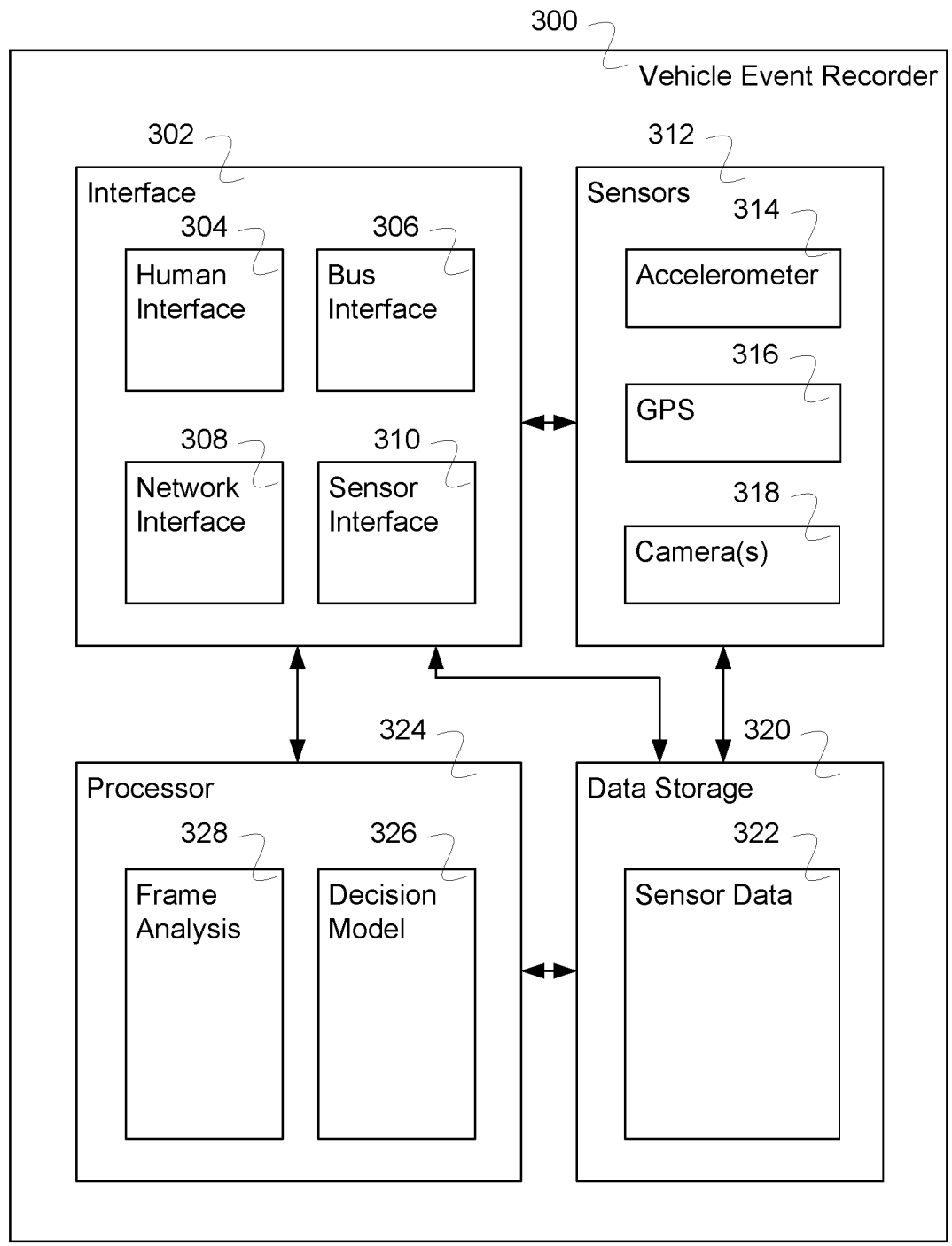
FIG. 3 is a block diagram illustrating an embodiment of a vehicle event recorder.

FIG. 3 is a block diagram illustrating an embodiment of a vehicle event recorder. In some embodiments, vehicle event recorder 300 of FIG. 3 comprises vehicle event recorder 102 of FIG. 1 or vehicle event recorder 204 of FIG. 2. In the example shown, vehicle event recorder 300 process sensor data using processor 324. Processor 324 receives sensor data via bus interface 306 of interface 302 or sensor interface 310 and from internal sensors (e.g., GPS 316, accelerometer 314, or camera(s) 318 of sensors 312). After receiving a sensor signal of interest, a start time and stop time are determined. A time sequence set of video frames is determined for processing. Processor 324 determines a decision using frame analysis 328 and decision model 326. In some embodiments, the processing of frames and decision determination is done by a server (e.g., a vehicle data server) after receiving the time sequence set of video frames.

Vehicle event recorder 300 comprises interface 302. Interface 302 comprises a set of interfaces to other systems. Human interface 304 comprises an interface to a human interaction system—for example, an audio output, a display output, etc. Bus interface 306 comprises an interface to a bus for receiving data from one or more vehicle state sensors coupled electrically to a bus. Sensor interface 310 comprises an interface to one or more vehicle event recorder sensors. In various embodiments, vehicle event recorder sensors (e.g., sensors 312) comprise an exterior video camera (e.g., camera(s) 318), an exterior still camera (e.g., camera(s) 318), an interior video camera (e.g., camera(s) 318), an interior still camera (e.g., camera(s) 318), a microphone, an accelerometer (e.g., accelerometer 314), a gyroscope, an outdoor temperature sensor, a moisture sensor, a laser line tracker sensor, vehicle state sensors, positioning sensor (e.g., GPS 316), or any other appropriate sensors. In various embodiments, vehicle state sensors comprise a speedometer, an accelerator pedal sensor, a brake pedal sensor, an engine revolutions per minute (RPM) sensor, an engine temperature sensor, a headlight sensor, an airbag deployment sensor, driver and passenger seat weight sensors, an anti-locking brake sensor, shocks sensors, an engine exhaust sensor, a gear position sensor, a turn signal sensor, a cabin equipment operation sensor, or any other appropriate vehicle state sensors. In some embodiments, bus interface 306 comprises a vehicle bus (e.g., society of automotive engineers (SAE) J1939, J1708/J1587, OBD-II, CAN BUS, etc.). In some embodiments, vehicle event recorder 300 communicates with vehicle state sensors via the vehicle bus.

Bus interface 306 comprises an interface to one or more vehicle control systems (e.g., for adjusting vehicle control parameters, for putting the vehicle in a safe mode, for adjusting an automatic driving control parameter, etc.). Network interface 308 comprises a network interface for communicating with other systems via a network (e.g., network 100 of FIG. 1). Network interface 308 comprises one or more of a GSM interface, a CDMA interface, an LTE interface, a WiFi™ interface, an Ethernet interface, a Universal Serial Bus (USB) interface, a Bluetooth™ interface, an Internet interface, etc. Processor 324 comprises a processor for controlling the operations of vehicle event recorder 300, for reading and writing information on data storage 320 (e.g., sensor data in sensor data 322), for reading and/or writing data via interface 302, etc. Processor 324 comprises an event detector for determining events from data (e.g., video data, sensor data, etc.), frame analysis 328 for analyzing video frames for activity detection (e.g., parallel video frame processing), and decision model 326 for determining whether an activity is detected in a set of video frames.

Data storage 320 comprises a data storage (e.g., a random access memory (RAM), a read only memory (ROM), a nonvolatile memory, a flash memory, a hard disk, or any other appropriate data storage). Data storage 320 comprises a data storage for storing instructions for processor 324, vehicle event recorder data, vehicle event data, sensor data, video data, vehicle information, vehicle identifying information, anomalous event information, etc. Data storage 320 stores continuous video data or other sensor data comprising stored continuous video data from one or more cameras mounted on the vehicle for a previous time period (e.g., 1 minute, 5 minutes, 1 hour, 1 day, etc.).

Figure 4:
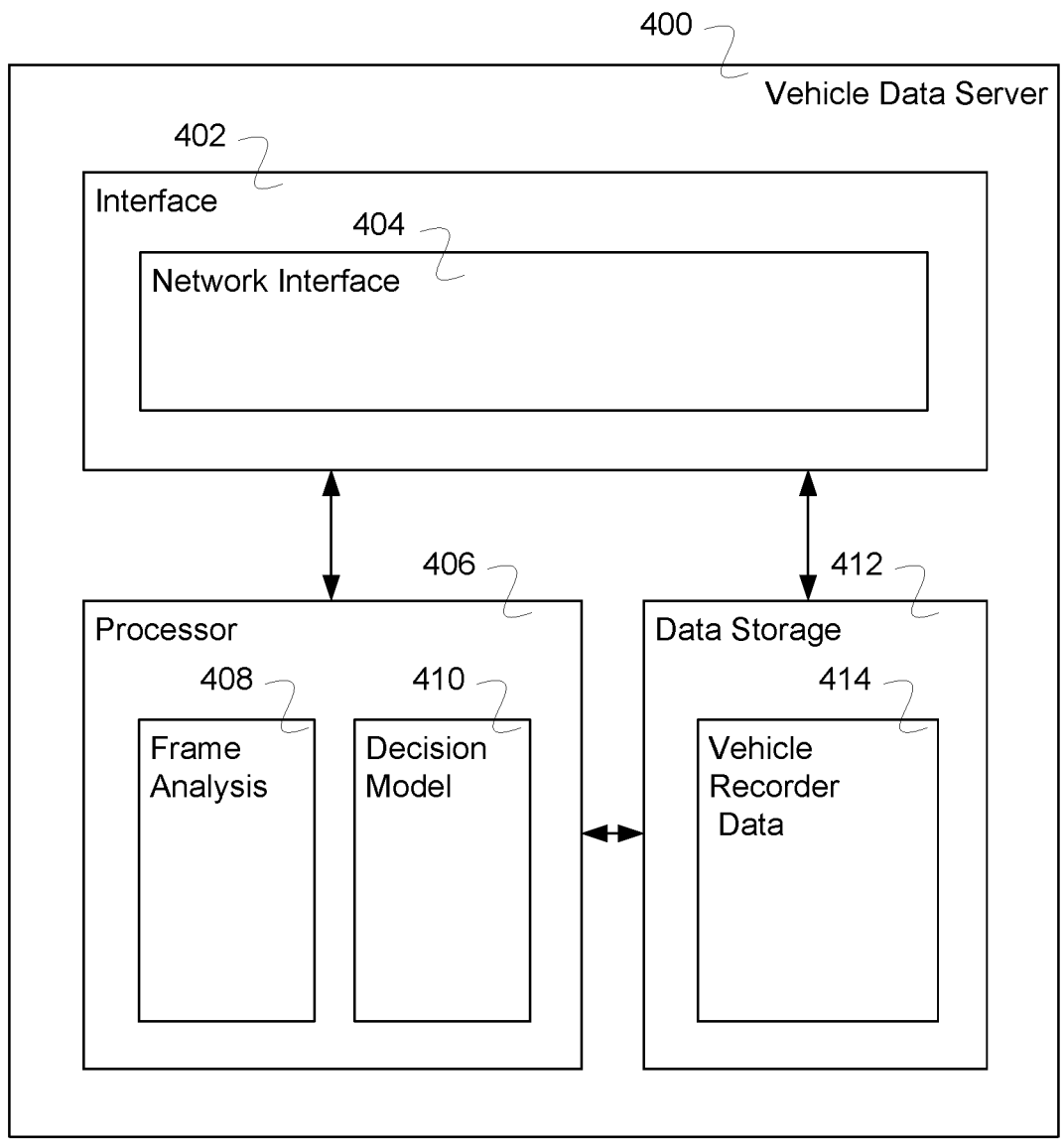
FIG. 4 is a block diagram illustrating an embodiment of a vehicle data server.

FIG. 4 is a block diagram illustrating an embodiment of a vehicle data server. In some embodiments, vehicle data server 400 comprises vehicle data server 104 of FIG. 1 or vehicle data server 208 of FIG. 2. In the example shown, vehicle data server 400 receives a set of time sequence set of video frames via network interface 404 of interface 402. The time sequence set of video frames are stored in vehicle recorder data 414 in data storage 412 and processed by processor 406. Specifically, each frame is processed using frame analysis 408 and these results are fed to decision model 410.

Figure 5:
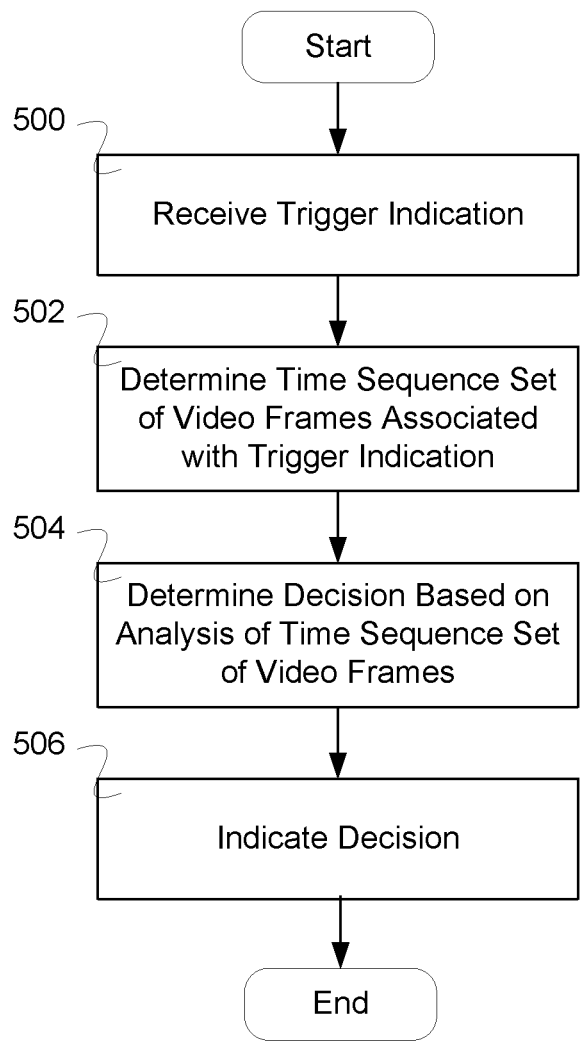
FIG. 5 is a flow diagram illustrating an embodiment of a process for multiframe analysis.

FIG. 5 is a flow diagram illustrating an embodiment of a process for multiframe analysis. In some embodiments, the process is executed by vehicle event recorder 102 of FIG. 1, vehicle event recorder 204 of FIG. 2, vehicle data server 104 of FIG. 1, or vehicle data server 208. In the example shown, in 500 a trigger indication is received. For example, a trigger signal is received from one or more of the following: a signal received via a vehicle bus signal (e.g., a bin lift signal, a door opening signal, a seat weight signal, an audio detection system, an engine RPM signal, a braking signal, etc.), a signal generated from computer vision processing (e.g., computer vision processing of a camera image, computer vision processing of video with a signal indicating the identification of an event such as a passenger present, a door open, vehicle operating, vehicle braking, etc.), a signal generated from data processing (e.g., data processing of sensor data with a signal indicating the identification of an event such as automated analysis of gyroscopic and/or accelerometer measurements indicating vehicle maneuvers of interest or signatures indicating a heavy object is being lifted, e.g., a full waste bin). For example, a signal is received at a vehicle event recorder via a bus from a sensor that is used as a trigger for finding an activity of interest. In 502, a time sequence set of video frames associated with a trigger indication is determined. For example, a start time and a stop time are determined as well as a set of video frames between the start time and stop time. In 504, a decision is determined based on an analysis of the time sequence set of video frames. For example, the video frames are processed in two stages; in the first stage, the frames are processed in parallel, and these results are combined and processed by a second stage to determine a decision regarding activity depicted in the video frames. In 506, a decision is indicated.

Figure 6:
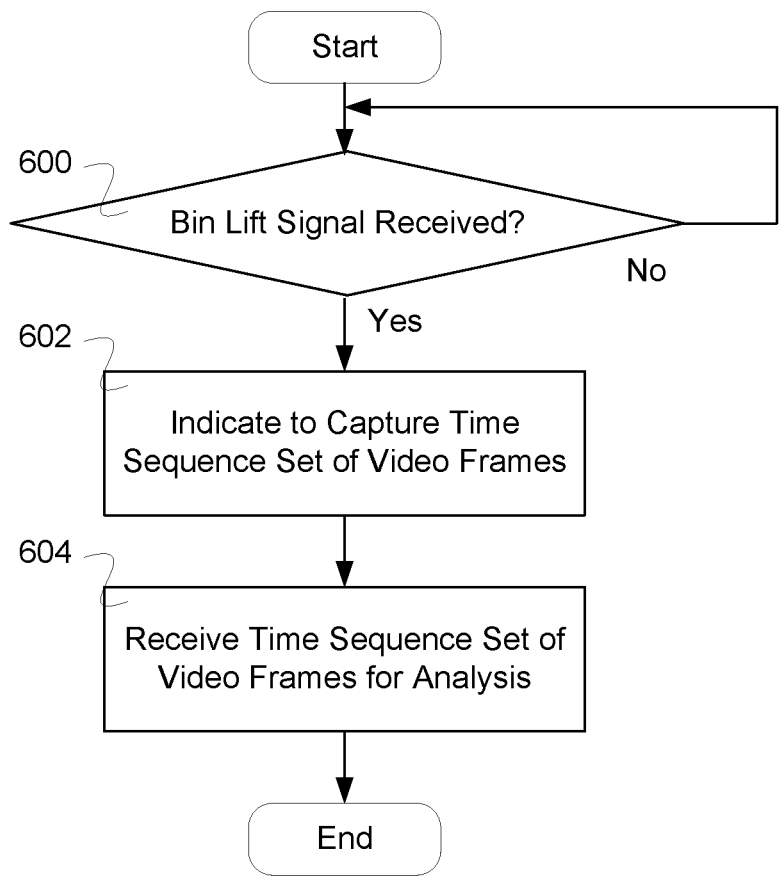
FIG. 6 is a flow diagram illustrating an embodiment of a process for a trigger indication.

FIG. 6 is a flow diagram illustrating an embodiment of a process for a trigger indication. In some embodiments, the process of FIG. 6 is used to implement 500 of FIG. 5—for example, in the event that a bin overflow activity is desired to be determined. In the example shown, in 600 it is determined whether a bin lift signal is received. In the event that a bin lift signal was not received, then control passes back to 600. In the event that a bin lift signal was received, then in 602 it is indicated to capture a time sequence set of video frames. In 604, the time sequence set of video frames for analysis is received.

Figure 7:
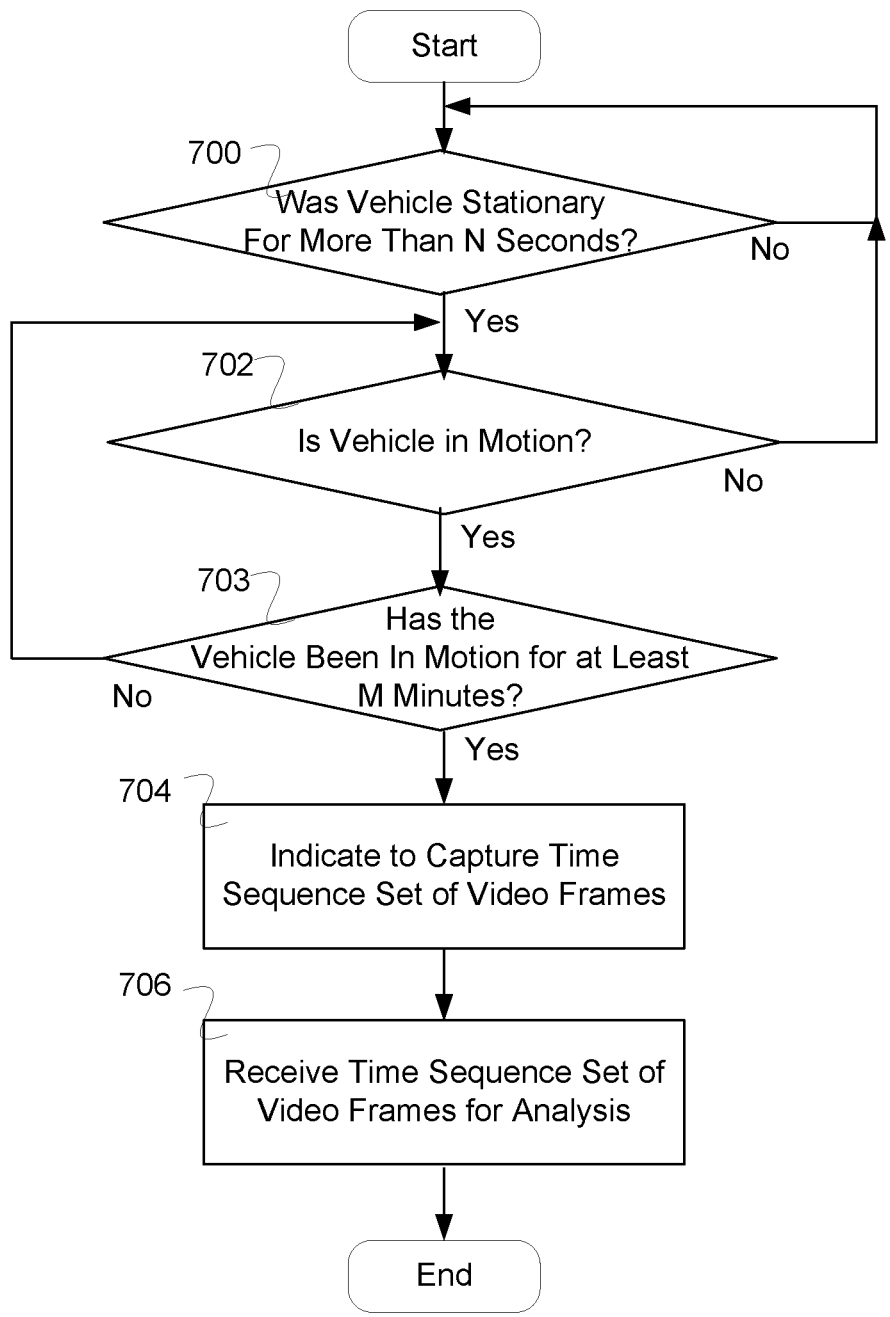
FIG. 7 is a flow diagram illustrating an embodiment of a process for a trigger indication.

FIG. 7 is a flow diagram illustrating an embodiment of a process for a trigger indication. In some embodiments, the process of FIG. 7 is used to implement 500 of FIG. 5—for example, in the event that a passenger pick up activity is desired to be determined. In the example shown, in 700 it is determined whether vehicle was stationary for more than N seconds. For example, it is determined if the vehicle made a stop for N seconds, where N is an integer number of seconds (e.g., was stationary for more than 20 seconds—N is 20). In the event that the vehicle was not stationary for more than N seconds, control passes back to 700. In the event that the vehicle was stationary for more than N seconds, it is determined in 702 whether the vehicle is in motion. In the event that the vehicle is not in motion, control passes to 700. In the event that the vehicle is in motion, in 703 it is determined whether the vehicle has been in motion for at least M minutes. For example, it is determined whether the vehicle has been in motion for at least M minutes, where M is an integer number of minutes (e.g., is in motion for at least 15 minutes). In the event that the vehicle has not been in motion for at least M minutes, then control passes to 702. In the event that the vehicle has been in motion for at least M minutes, then in 704 it is indicated to capture a sequence set of video frames. For example, in the event that the engine running signal is not present after a period of time (e.g., a cruising period), then it is indicated to capture a sequence set of video frames. In 706, a time sequence set of video frames is received for analysis.

Figure 8:
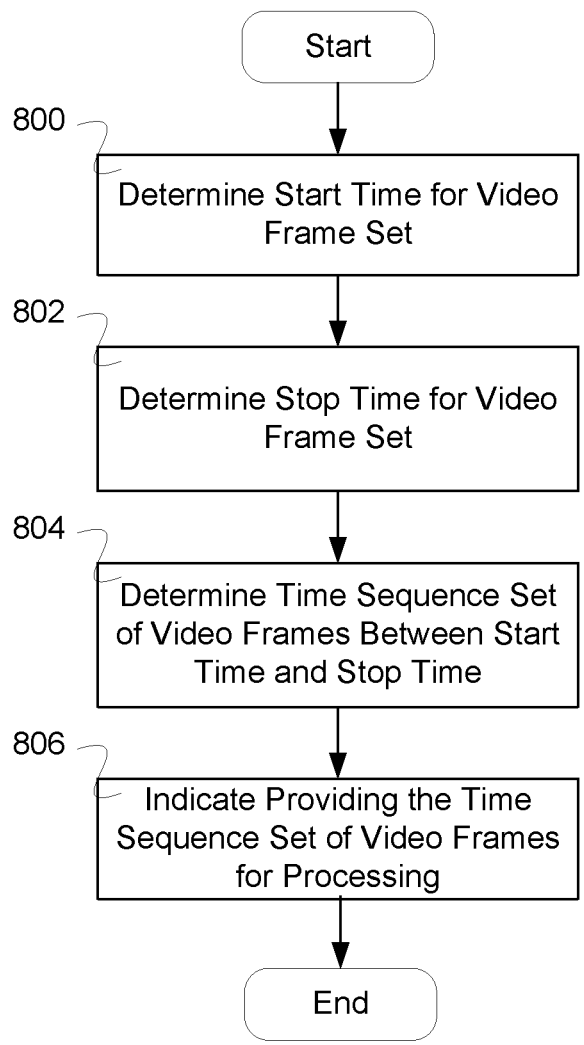
FIG. 8 is a flow diagram illustrating an embodiment of a process for determining a time sequence set of video frames associated with a trigger indication.

FIG. 8 is a flow diagram illustrating an embodiment of a process for determining a time sequence set of video frames associated with a trigger indication. In some embodiments, the process of FIG. 8 is used to implement 502 of FIG. 5. In the example shown, in 800 a start time is determined for the video frame set. In 802, a stop time is determined for the video frame set. In 804, a time sequence set of video frames between the start time and the stop time is determined. In 806, it is indicated to provide the time sequence set of video frames for processing.

Figure 9:
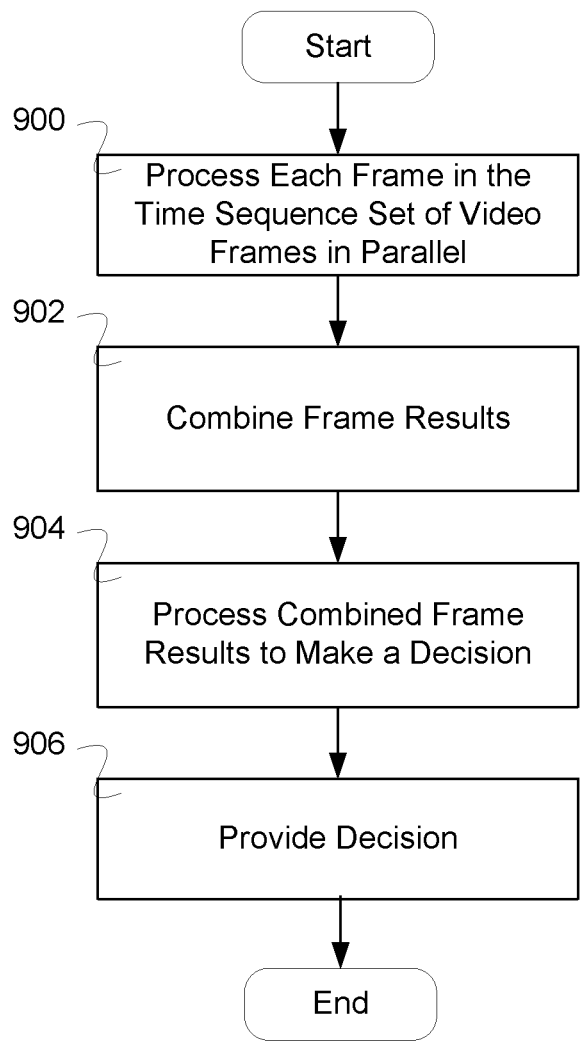
FIG. 9 is a flow diagram illustrating an embodiment of a process for determining a decision based on an analysis of the time sequence set of video frames.

FIG. 9 is a flow diagram illustrating an embodiment of a process for determining a decision based on an analysis of the time sequence set of video frames. In some embodiments, the process of FIG. 9 is used to implement 504 of FIG. 5. In the example shown, in 900 each frame in the time sequence set of video frames is processed in parallel. In 902, the frame results are combined. In 904, the combined frame results are processed to make a decision. In 906, a decision is provided.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for video analysis, comprising:
   an interface configured to receive a trigger indication, wherein the trigger indication comprises a bin lift signal being detected on a truck;
   a processor configured to:
   determine a time sequence set of video frames associated with the trigger indication;
   determine a decision based at least in part on an analysis of the time sequence set of video frames, comprising to:
   process the time sequence set of video frames in parallel;
   combine the results of the processing of the time sequence set of video frames; and
   determine the decision regarding the activity depicted in the time sequence set of video frames, wherein the decision includes a determination of whether the time sequence set of video frames includes a bin that is overflowing prior to being emptied; and
   indicate the decision.

2. The system as in claim 1, wherein the analysis of the time sequence set of video frames comprises parallel processing of a plurality of frames of the time sequence set of video frames.

3. The system as in claim 2, wherein the parallel processing output is processed using a neural net.

4. The system as in claim 1, wherein the analysis of the time sequence set of video frames includes classification of each frame of the time sequence set of video frames.

5. The system as in claim 4, wherein the classification of each frame is combined with other classifications to determine the decision.

6. The system as in claim 1, wherein the interface is configured to receive the time sequence set of video frames.

7. The system as in claim 1, further comprising a data storage device, wherein the data storage device stores the time sequence set of video frames.

8. The system as in claim 1, wherein the time sequence set of video frames is captured using a video camera mounted to a vehicle.

9. The system as in claim 8, wherein the time sequence set of video frames is transmitted to a server from the vehicle.

10. The system as in claim 9, wherein the analysis is performed by the server.

11. The system as in claim 1, wherein the analysis is performed by a computing system in a vehicle.

12. The system as in claim 1, wherein the trigger indication is received using a vehicle bus signal.

13. The system as in claim 1, wherein the decision comprises a bin overflow decision.

14. The system as in claim 1, wherein the trigger indication comprises a door opening signal following an engine running for greater than a cruising period.

15. The system as in claim 1, wherein the decision comprises a passenger pickup decision.

16. The system as in claim 1, wherein the trigger indication comprises a signal generated using computer vision or a signal generated using data processing.

17. The method for video analysis, comprising:
receiving a trigger indication, wherein the trigger indication comprises a bin lift signal being detected on a truck;
determining, using a processor, a time sequence set of video frames associated with the trigger indication;
determining a decision based at least in part on an analysis of the time sequence set of video frames, comprising:
processing the time sequence set of video frames in parallel;
combining the results of the processing of the time sequence set of video frames; and
determining the decision regarding the activity depicted in the time sequence set of video frames, wherein the decision includes a determination of whether the time sequence set of video frames includes a bin that is overflowing prior to being emptied; and
indicating the decision.

18. A non-transitory computer program product for video analysis, the computer program product being embodied in a non-transitory computer readable storage medium and comprising computer instructions for:
receiving a trigger indication, wherein the trigger indication comprises a bin lift signal being detected on a truck;
determining, using a processor, a time sequence set of video frames associated with the trigger indication;
determining a decision based at least in part on an analysis of the time sequence set of video frames, comprising:
processing the time sequence set of video frames in parallel;
combining the results of the processing of the time sequence set of video frames; and
determining the decision regarding the activity depicted in the time sequence set of video frames, wherein the decision includes a determination of whether the time sequence set of video frames includes a bin that is overflowing prior to being emptied; and
indicating the decision.

\* \* \* \* \*